US005679391A

United States Patent [19]
Clement et al.

[11] Patent Number: 5,679,391
[45] Date of Patent: Oct. 21, 1997

[54] PROCESS FOR MANUFACTURING COOKED HAM

[75] Inventors: Véronique Clement, Bulle; Evin Dilber-Van Griethuysen, Pully; Marcel Alexandre Juillerat, Lausanne, all of Switzerland

[73] Assignee: Nestec S.A., Vevey, Switzerland

[21] Appl. No.: 442,284

[22] Filed: May 16, 1995

[30] Foreign Application Priority Data

May 27, 1994 [EP]  European Pat. Off. ............ 94810310

[51] Int. Cl.⁶ .................................................. A23L 1/318
[52] U.S. Cl. ........................ 426/281; 426/332; 426/645; 426/652
[58] Field of Search ........................ 426/281, 332, 426/645, 650, 652, 330

[56] References Cited

U.S. PATENT DOCUMENTS

| | | | |
|---|---|---|---|
| 2,532,842 | 12/1950 | Hill | 426/281 X |
| 2,596,067 | 5/1952 | Brissey | 426/281 X |
| 3,663,233 | 5/1972 | Keszler | 426/281 |
| 3,775,134 | 11/1973 | Michel et al. | 426/281 |
| 4,029,824 | 6/1977 | Langen | 426/281 |
| 4,992,287 | 2/1991 | Dreano | 426/418 |

FOREIGN PATENT DOCUMENTS

| | | |
|---|---|---|
| A-0 274334 | 7/1987 | European Pat. Off. |
| WO-A-92/018011 | 10/1992 | WIPO |

OTHER PUBLICATIONS

Suzuki et al., "Effect of High Pressure Treatment on the Ultrastructure and Myofibrillar Protein of Beef Skeletal Muscle", Agric. Biol. Chem. 54 (12), 1990, 3085–3091.
Kim et al., "Pressure–Induced Conversion of α–Connectin to β–Connectin" Meat Science 32, 1992, 237–243.
DataBase WPI, Week 9301, Derwent Publications Ltd., London, GB; AN 93–006225 &JP-A-4 335 873 (T. Kakajo et al.) Nov. 24, 1992.
Prepared Foods, vol. 162, No. 2, Feb. 1993 pp. 49–50 PF 'Pateurization revisited'.
Food Technology, vol. 47, No. 6, Jun. 1993, Chicago, Illinois, US; pp. 150–155, D.G. Hoover 'Pressure Effects on Biological Systems'.
Database WPI, Week 9314, Derwent Publications Ltd., London, GB; An 93–111803 & JP-A-5 049 391 (Nippon HAM KK) Mar. 2, 1993.
Database WPI, Week 7634, Derwent Publications Ltd., London, GB; AN 76–643776X & JP-B–51 024 586 (Nippon Shoukuhin KAK KK) Jul. 25, 1976.
Database WPI, Week 9333, Derwent Publications Ltd., London, GB; AN 93–260777 & JP-A-5176 673 (Alon World KK et al.).
Food Science and Technology Abstracts AN—91:7717 DN–91–06–E0029 International Food Information Services Berkshire, Reading, GB M. Okamoto et al. "Application of high pressure to food processing" & Agricultural and Biological Chemistry vol. 54 No. 1 1990 pp. 183–189.
Food Science and Technology Abstracts AN–92:10470, DN–92–07–S)106 International Food Information Service Berkshire Reading GB K. Kim et al. "Pressure–induced conversion of alpha connection to beta connection" & Meat Science, vol. 32 No. 2, 1992 pp. 237–243.
Food Technology, vol. 47, No. 6, Jun. 1993, Chicago, Illinois, US, pp. 164–169, B. Mertens et al., 'Engineering Aspects of High–Pressure Technology in the Food Industry'.

*Primary Examiner*—Milton Cano
*Attorney, Agent, or Firm*—Pennie & Edmonds

[57] ABSTRACT

A process for manufacturing cooked ham, comprising trimming and cutting pig muscles into pieces, treating the pieces with a high hydrostatic pressure, injecting brine into the pressure treated pieces of pig muscles, tumbling, filling in moulds or casings, cooking and cooling the pig muscles. Cooking yield without negatively affecting the texture is improved.

12 Claims, No Drawings

5,679,391

PROCESS FOR MANUFACTURING COOKED HAM

TECHNICAL FIELD

The present invention concerns the manufacture of cooked ham by a process comprising trimming and cutting pig muscles into pieces, injecting brine into the pieces, tumbling, filling, cooking and cooling them.

BACKGROUND ART

There are many conventional methods for manufacturing cooked hams. In most all methods, the yield of the cooked ham is reduced, with loss of salable product as a result. The present invention provides an improved process wherein improved yields of cooked hams are achieved.

SUMMARY OF THE INVENTION

The present invention relates to a process for manufacturing cooked ham with an improved cooking yield without negatively affecting the texture.

To this end, the process according to the present invention comprises a step of treating said pieces of pig muscles with a hydrostatic pressure of from 300 to 2000 bar before injecting brine into them.

Actually it was surprisingly found that the cooking yield of a ham prepared according to the present invention could be improved by at least about 0.5% and typically about 0.7 to 1.2%, for example, as compared with a cooked ham obtained by a traditional process comprising trimming and cutting pig muscles into pieces, injecting brine into them, tumbling, filling, cooking and cooling them, but without the texture of the ham being negatively affected or, even better, with this texture being possibly slightly improved.

DETAILED DESCRIPTION OF THE PREFERRED EMBODIMENTS

For carrying out the present process, one can use muscles of pigs, especially the muscle called *M. vastus lateralis*. The muscles may be trimmed from visible fat and connective tissue and cut in pieces.

For treating the pieces of pig muscles with a hydrostatic pressure of from 300 to 2000 bars, it is preferred to isolate them from a liquid, namely a water or an oil, for example, used for transmitting such a high hydrostatic pressure, typically by means of vacuum packing them in plastic bags.

The packed pieces may be placed within a chamber of a high pressure equipment where the high hydrostatic pressure treatment may be carried out for a time and at a temperature adequate for obtaining an actual effect on the cooking yield and possibly on the texture of the ham. The treatment time may be at least about 2 up to 60 min, preferably up to 10 min. This treatment time is determined from the moment when the hydrostatic pressure reaches the desired value, the time necessary for raising the pressure to this value being about one minute, for example. The treatment temperature may be from 2° to 60° C., preferably from 5° to 25° C.

The pressure treated pieces of pig muscles may then be unpacked.

Brine may be injected into the unpacked pieces in an amount of at least about 10% and typically from about 12 to 35% by weight of the pieces, the brine comprising, in percent by weight of the pieces:

1.0 to 3.0% nitrite curing salt,
up to 3.0% sodium chloride,
up to 3.0% dextrose,
up to 0.6% phosphate, and
up to 0.2% ascorbate, for example.

The nitrite curing salt may include a mixture of sodium chloride with sodium nitrite, the amount of the latter amounting to about 0.3 to 1.0%, preferably from 0.4 to 0.6% of the salt.

The phosphate may be sodium diphosphate and/or sodium triphosphate, for example.

The ascorbate may be sodium ascorbate, for example.

Tumbling may be performed at atmospheric pressure or under vacuum in a tumbler cooled with water chilled at 0° to 10° C., continuously or intermittently (with alternating tumbling times and resting times), for a total time of at least about 1 h and generally about 2 to 24 h.

The tumbled pieces may be filled in moulds or vacuum filled in natural or synthetic casings, the weight of the crude ham reconstituted in this way being about 1.5 to 3 kg.

Advantageously, this crude ham may then be cooked at atmospheric pressure, at a relative humidity of from 80 to 100% and at 60° to 80° C. for 3 to 12 h. Preferably, it is cooked in a first cycle at a relatively low temperature of about 60° to 70° C. until its core temperature is about 52° to 58° C. and in a second cycle at a relatively high temperature of about 70° to 80° C. until its core temperature is about 65° to 75° C.

The cooked ham may be cooled in a water bath until its core temperature is about 20° to 25° C., and it may then be stored at refrigeration temperatures 2° to 8° C.

EXAMPLES

The examples hereafter illustrate different embodiments of the process and of the product according to the present invention. The percentages are by weight unless otherwise stated.

In these examples, the texture of the hams was evaluated by testing their hardness and their stress relaxation. For testing their hardness, cylindrical samples 18 mm in diameter and 50 mm in length were cut out from the hams and sheared with a Warner-Bratzler (W-B) shear press cell mounted on an Instron Universal Testing Machine (Model 1140). The cross head speed was 100 mm/min. The shear forces measured on 15 samples randomly distributed between the hams were averaged and expressed in N.

For testing their stress relaxation, cylindrical samples 18 mm in diameter and 25 mm in length were cut out from the hams and compressed with a cylindrical rod 0.5 mm in hight and 54 mm in diameter mounted on an Instron Universal Testing Machine (Model 1122). The cross head speed was 20 mm/min. The samples were compressed vertically down to a thickness of 5 mm and held there for 30 s. A stress relaxation was defined as the ratio between the forces measured at the beginning and at the end of the compression. The stress relaxations determined on 15 samples randomly distributed between the hams were averaged and expressed without dimension.

The cooking yield was calculated from the weight of the hams taken before and after cooking and expressed in percents without dimension.

Example 1

Muscles *M. vastus lateralis* of the leg of pigs were delivered 72 h post mortem and divided in two batches of 20 kg each. The muscles from the one batch were used for preparing cooked ham by a process according to the present invention. The muscles from the other batch were used for preparing cooked ham according to the same process but without the step of treating the pieces of pig muscles with a high hydrostatic pressure.

The muscles were trimmed from visible fat and connective tissue and cut in two pieces of about 500 g each. The pieces were packed individually in plastic bags under vacuum with an Inauer VC 999/09 sealer.

The treatment with a high hydrostatic pressure was carried out with a National Forge machine having a high pressure chamber of 8.6 l. The packed pieces were treated batchwise with a hydrostatic pressure of 1000 bar for 10 min at about 10° C. The pressure treated pieces were then unpacked.

A brine to be injected into the unpacked pieces in an amount of 15% was prepared 24 h before use and had the following composition:

| | |
|---|---|
| Nitrite curing salt (0.6% NaNO$_2$) | 15.33% |
| Sodium chloride | 3.83% |
| Dextrose | 15.33% |
| Tetrasodium pyrophosphate | 1.53% |
| Sodium ascorbate | 0.23% |

The brine was injected into the unpacked pieces with a Fomaco FGM 20/40 multineedle injector under an injection pressure of about 1 bar and at a temperature of about 9° C.

The pieces were then tumbled under vacuum with a Stephan VM 60 tumbler at 2°–4° C. for a total time of 4 h, 45 min tumbling times alternating with 15 min resting times.

The tumbled pieces of pig muscles were vacuum filled in synthetic fibrous casings 110 mm in diameter with a Handtmann Vacuum flier VF 80 so that the crude hams reconstituted in this way had a weight of about 2 kg.

The crude hams were cooked in a Salvis Combisteam CSC 111 at atmospheric pressure and at a relative humidity of 100% in two cooking cycles. In the first cycle the oven temperature was set at 64° C. until the core temperature of the hams was 55° C. In a second cycle the oven temperature was increased to 74° C. until the core temperature of the hams was 68° C. The total cooking time was about 4 h.

The cooked hams were cooled for 2 h in a water bath at 6° C. They had then a core temperature of about 23° C. They were then stored overnight at 4° C.

The cooking yield and the texture of the hams thus obtained and those of the control samples were tested as disclosed above. The results are presented in Table 1 hereafter.

TABLE 1

| Pressure (bar) | Cooking Yield (%) | Shear force (N) | Stress rel. (dimensionless) |
|---|---|---|---|
| 0 (Control) | 95.45 | 25.7 | 1.63 |
| 1000 | 96.61 | 25.4 | 1.54 |

It may be seen in Table 1 that the cooked ham obtained by the process of the present invention had a cooking yield improved by 1.16% as compared with the control sample which was not pressure treated, without its texture being negatively affected (same shear force as control) and even with this texture being slightly improved (stress relaxation slightly better than control, a smaller ratio of compressing forces being better).

Example 2

Cooked hams were manufactured as disclosed in Example 1 except the fact that the treatment with a hydrostatic pressure of 1000 bar was carried out for 20 min instead of for 10 min.

The cooking yield and the texture of the hams thus obtained and those of the control samples were tested as disclosed above. The results are presented in Table 2 hereafter.

TABLE 2

| Pressure (bar) | Cooking Yield (%) | Shear force (N) | Stress rel. (dimensionless) |
|---|---|---|---|
| 0 (Control) | 93.79 | 32.6 | 1.60 |
| 1000 | 97.48 | 34.1 | 1.65 |

It may be seen in Table 2 that the cooked ham obtained by the process of the present invention had a cooking yield improved by 0.69% as compared with the control sample which was not pressure treated, without its texture being negatively affected (nearly same stress relaxation as control) and even with this texture being slightly improved (slightly higher shear force than control).

Example 3

Cooked hams were manufactured as disclosed in Example 1 except the fact that a brine having the following composition was injected into the unpacked pieces in an amount of 30%:

| | |
|---|---|
| Nitrite curing salt (0.6% NaNO$_2$) | 8.66% |
| Sodium chloride | 2.17% |
| Dextrose | 8.66% |
| Tetrasodium pyrophosphate | 0.87% |
| Sodium ascorbate | 0.13% |

The cooking yield and the texture of the hams thus obtained and those of the control samples were tested as disclosed above. The results are presented in Table 3 hereafter.

TABLE 3

| Pressure (bar) | Cooking Yield (%) | Shear force (N) | Stress rel. (dimensionless) |
|---|---|---|---|
| 0 (Control) | 96.21 | 25.2 | 1.52 |
| 1000 | 97.12 | 21.5 | 1.45 |

It may be seen in Table 3 that the cooked ham obtained by the process of the present invention had a cooking yield improved by 0.91% as compared with the control sample which was not pressure treated, without its texture being negatively affected (slightly lower shear force compensated by a slightly lower stress relaxation than control).

Comparative Example (i)

Cooked hams were manufactured as disclosed in Example 1 except the fact that the brine was injected into the pieces before the pieces were packed, treated with a hydrostatic pressure of 1000 bar and unpacked, instead of afterwards.

The cooking yield and the texture of the hams thus obtained and those of the control samples were tested as disclosed above. The results are presented in Table (i) hereafter.

TABLE (i)

| Pressure (bar) | Cooking Yield (%) | Shear force (N) | Stress rel. (dimensionless) |
|---|---|---|---|
| 0 (control) | 94.37 | 23.7 | 1.59 |
| 1000 (comparative) | 93.61 | 21.0 | 1.62 |

It may be seen in Table (i) that the cooked ham obtained by the process of this first comparative example had a cooking yield diminished as compared with the control sample which was not pressure treated.

Comparative Example (ii)

Cooked hams were manufactured as disclosed in Example 1 except the fact that the brine was not injected into the unpacked pieces but was simply added to them into the tumbler at the beginning of the tumbling step.

The cooking yield and the texture of the hams thus obtained and those of the control samples were tested as disclosed above. The results are presented in Table (ii) hereafter.

TABLE (ii)

| Pressure (bar) | Cooking Yield (%) | Shear force (N) | Stress rel. (dimensionless) |
|---|---|---|---|
| 0 (control) | 95.16 | 22.5 | 1.62 |
| 1000 (comparative) | 95.14 | 22.9 | 1.72 |

It may be seen in Table (ii) that the cooked ham obtained by the process of this second comparative example had a cooking yield unchanged as compared with the control sample which was not pressure treated.

We claim:

1. A process for manufacturing cooked ham with improved cooking yield which comprises the steps of subjecting pieces of pig muscles to a hydrostatic pressure of from about 300 to 2000 bar; injecting a brine into the pressure-treated pieces; and cooking the pieces to manufacture a cooked ham having an improved cooking yield.

2. A process according to claim 1, further comprising trimming and cutting the pig muscles into the pieces, vacuum packing said pieces prior to subjecting the packed pieces with said hydrostatic pressure for at least about 2 up to 60 minutes at a temperature of about 2° to 60° C., unpacking the pressure-treated pieces before injecting the brine into them, tumbling the brine-injected pieces prior to cooking and cooling the ham after cooking.

3. A process according to claim 2, which comprises treating said packed pieces with a hydrostatic pressure of from 300 to 2000 bar for up to 10 min at 5° to 25° C.

4. A process according to claim 2, in which said tumbling is performed under vacuum at 0° to 10° C. for about 2 to 24 h.

5. A process according to claim 1, in which said brine is injected into the pieces of pig muscles in an mount of from about 12 to 35% by weight of the pieces, the brine comprising, in percent by weight of the pieces:

about 1.0 to 3.0% nitrite curing salt up to 3.0% sodium chloride up to 3.0% dextrose up to 0.6% phosphate and up to 0.2% ascorbate.

6. A process according to claim 1, in which the tumbled pieces are filled in moulds or casings.

7. A process according to claim 1, in which said cooking is performed at atmospheric pressure, at a relative humidity of from about 80 to 100% and at about 50° to 80° C. for about 3 to 12 h.

8. The process of claim 1 wherein the cooking yield is increased by at least about 0.5%.

9. The process of claim 1 which further comprises tumbling the brine injected pieces prior to cooking.

10. The process of claim 1 which further comprises cooling the cooked ham.

11. A process for manufacturing cooked ham with improved cooking yield which comprises the steps of trimming and cutting pig muscles into pieces; subjecting said pieces to a hydrostatic pressure of about 300 to 2000 bar for at least about 2 minutes; injecting a brine into the pressure-treated pieces in an amount of at least about 10% by weight of the pieces; tumbling the brine injected pieces for at least about 1 hour; filling the tumbled pieces into a mould or casing; and cooking the pieces for a sufficient time and at a sufficient temperature to manufacture a cooked ham with a cooking yield which is improved by at least about 0.5%.

12. A process according to claim 11, wherein the hydrostatic pressure is applied for 10 to 60 minutes at a temperature of about 2° to 60° C., and the method further comprises vacuum packing said pieces prior to treatment with hydrostatic pressure; unpacking the pressure-treated pieces before injecting the brine into them; and cooling the ham after cooking.

* * * * *